(12) United States Patent
Mouskis

(10) Patent No.: US 7,422,179 B2
(45) Date of Patent: Sep. 9, 2008

(54) APPARATUS FOR AERIAL REFUELLING

(75) Inventor: Christopher Mouskis, Dorset (GB)

(73) Assignee: Flight Refuelling Limited, Dorset (GB)

( * ) Notice: Subject to any disclaimer, the term of this patent is extended or adjusted under 35 U.S.C. 154(b) by 0 days.

(21) Appl. No.: 11/350,081

(22) Filed: Feb. 9, 2006

(65) Prior Publication Data

US 2007/0181748 A1    Aug. 9, 2007

(51) Int. Cl.
*B64D 39/00* (2006.01)

(52) U.S. Cl. .................. 244/135 A; 244/136; 137/899.2

(58) Field of Classification Search ............. 244/135 A, 244/135 R, 135 B, 135 C, 136; 242/399, 242/232, 233, 276, 316, 542, 390.8, 396, 242/483, 783; 137/355.12, 899.2, 899.3
See application file for complete search history.

(56) References Cited

U.S. PATENT DOCUMENTS

| | | | | |
|---|---|---|---|---|
| 446,745 A | * | 2/1891 | Schenck et al. ......... | 137/355.26 |
| 2,514,862 A | * | 7/1950 | Hannay .................... | 137/355.2 |
| 2,519,064 A | * | 8/1950 | Palm ...................... | 137/355.19 |
| 2,774,547 A | * | 12/1956 | Latimer-Needham et al. ........................ | 242/390 |
| 2,879,017 A | * | 3/1959 | Smith ..................... | 244/135 A |
| 2,887,297 A | * | 5/1959 | MacGregor et al. ...... | 242/396.1 |
| 2,953,332 A | * | 9/1960 | Cobham et al. ......... | 244/135 A |
| 2,954,190 A | * | 9/1960 | Le Clair ................. | 244/135 A |
| 2,964,258 A | * | 12/1960 | Kutil ...................... | 242/399.2 |
| 3,590,656 A | * | 7/1971 | Lloyd, Jr. .................... | 74/575 |
| 3,674,049 A | * | 7/1972 | Macgregor ............... | 137/355.2 |
| 4,534,384 A | * | 8/1985 | Graham et al. ........... | 137/899.2 |
| 4,538,948 A | * | 9/1985 | Melton ..................... | 414/24.6 |
| 5,678,599 A | * | 10/1997 | Moss ........................ | 137/377 |
| 6,786,455 B1 | * | 9/2004 | Bartov ..................... | 244/135 A |
| 6,866,228 B2 | * | 3/2005 | Bartov ..................... | 244/135 A |

* cited by examiner

*Primary Examiner*—Michael J. Carone
*Assistant Examiner*—Benjamin P Lee
(74) *Attorney, Agent, or Firm*—Finnegan, Henderson, Farabow, Garrett & Dunner, L.L.P.

(57) ABSTRACT

Apparatus for aerial refuelling comprises a frame 2 for attaching around an aperture in an aircraft floor 3, and a movable hose drum housing 4 pivotally mounted on the frame. The hose drum 12 may be stowed within the aircraft, and moved into the aperture, for example using screw jacks 20, for deployment of the drogue 40. Since the hose is deployed from a position nearer the outside of the aircraft, the hose does not scrape the edge of the aperture even when lying at a shallow angle to the aircraft.

9 Claims, 4 Drawing Sheets

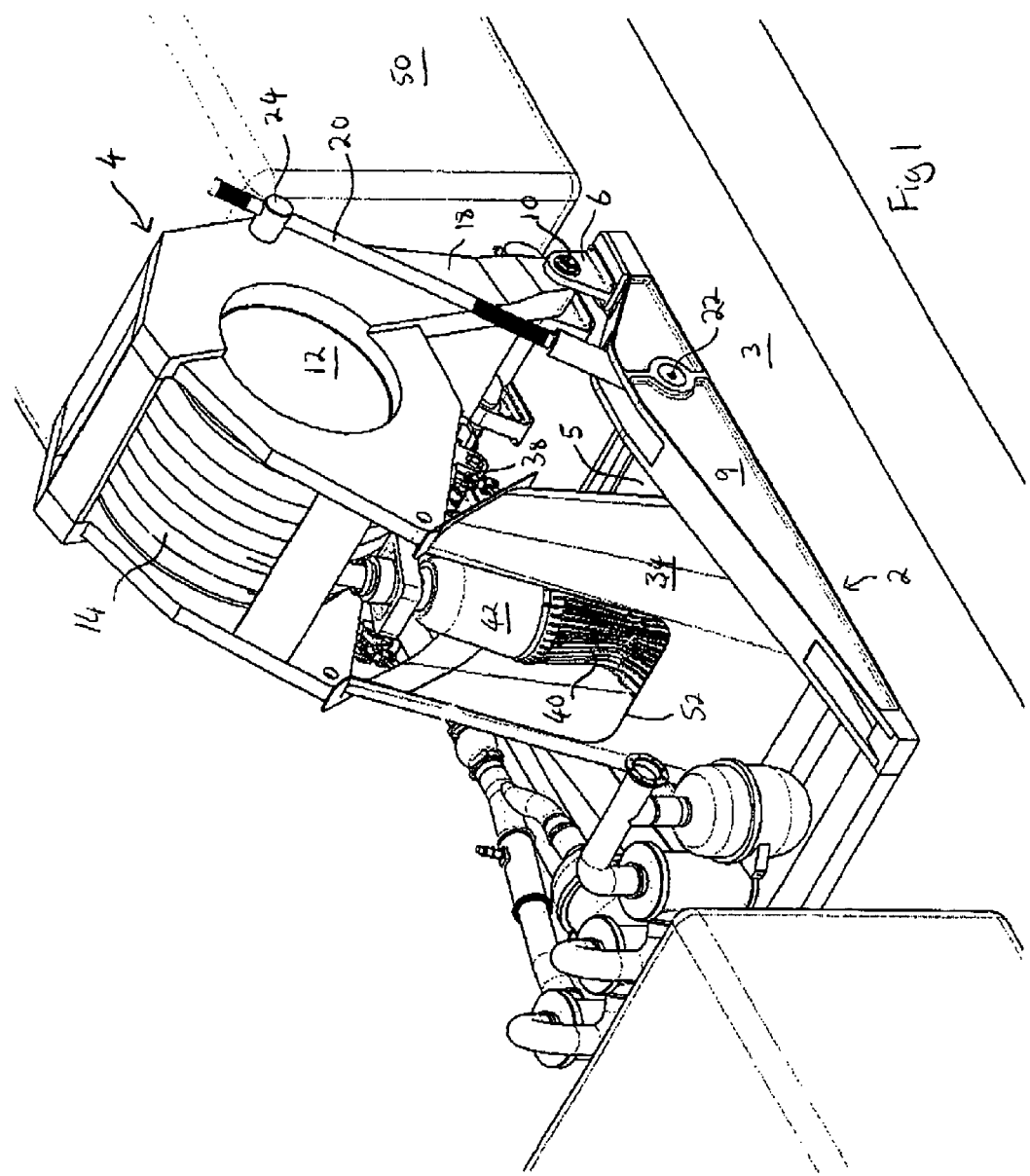

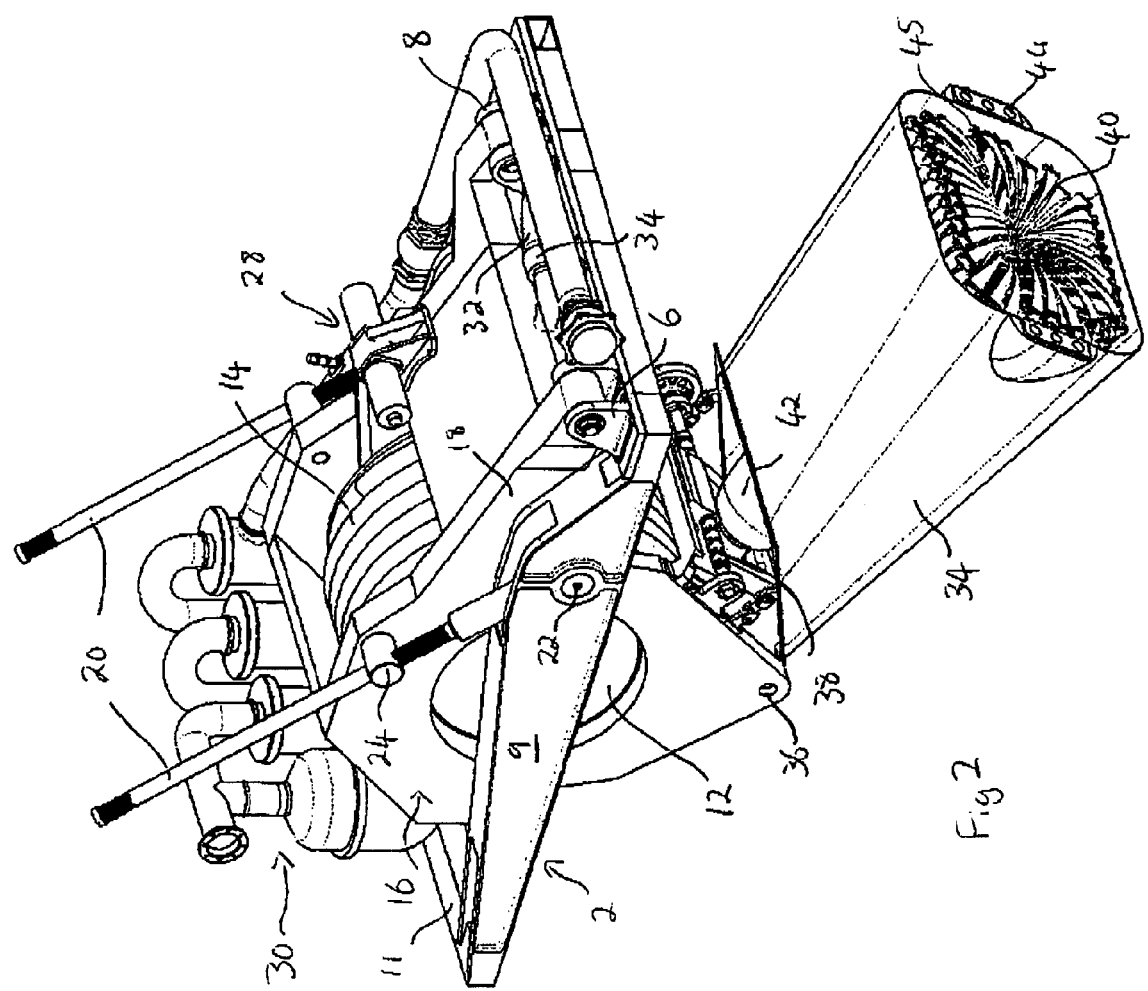

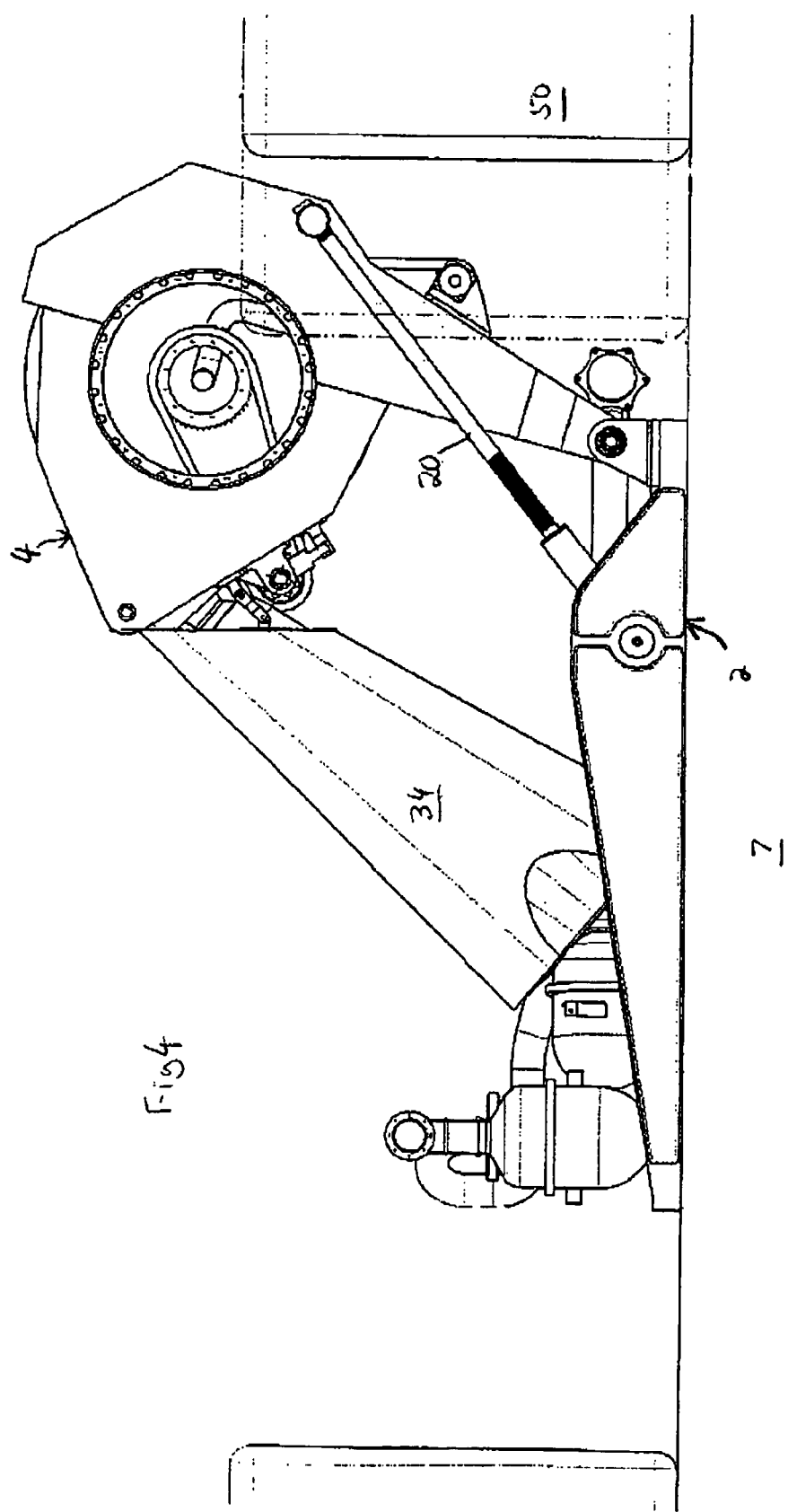

APPARATUS FOR AERIAL REFUELLING

BACKGROUND OF THE INVENTION

This invention relates to apparatus for aerial refuelling, and in particular to apparatus for deploying a hose and drogue through an aperture in the airframe of an aircraft.

There is a requirement for deploying a refuelling hose and drogue through the floor of a tanker aircraft cabin. Items projecting through a cabin floor aperture must be retracted for aerodynamic and ground clearance reasons when not in use. It is therefore necessary to deploy the drogue and hose through the aperture in the cabin floor during flight. The deployed hose in flight will naturally lie at a shallow angle with the aircraft body. Therefore the passage of the drogue during deployment, and the line of the hose out of the aperture, must approximate to this shallow angle to prevent the hose scraping the edge of the aperture.

The floor of the aircraft has a finite structural depth, and the aperture has a limited length. In the past it has been proposed to guide the hose through the floor in a deployment tunnel. Prior attempts to put this into practice have involved moving a deployment tunnel into the floor aperture, and deploying the hose and drogue through the tunnel. However the angle of the tunnel tends to be too steep, such that this system cannot always accommodate the shallow hose angles required. This is because a change of hose angle at the exit of the deployment tunnel would cause the hose to bear against the edge thereof.

The present invention aims to provide a simple deployment system which allows the hose to lie at the correct angle without bearing against the edge of the aperture or the deployment apparatus. It aims to provide a system suitable for use with tanker aircraft which have a relatively short and deep aperture available in the cabin floor for deployment.

SUMMARY OF THE INVENTION

According to the present invention there is provided apparatus for deploying a refuelling hose and drogue from an aperture in an aircraft airframe, the apparatus comprising a frame for attaching to the inside of the airframe adjacent the aperture, and a hose drum for mounting the hose, the drum being mounted on the frame and being movable relative thereto between a stowed position and a deployed position.

Thus when the hose is to be deployed the hose drum may be moved closer to the aperture. For example, the hose drum may project below the frame in the deployed position thereof. Therefore, in use, it will project into the structural depth of the airframe aperture.

With this arrangement the hose may leave the drum at a position within the depth of the aperture, such that it may lie at a shallow angle when deployed without interference from the outer edge of the aperture.

Preferably the drum is pivotally mounted to the frame. For example, the frame may extend around some or all of the edges of the aperture, and the drum may have a housing pivotally mounted to the frame at one edge thereof.

Preferably the drum housing includes a hose serving carriage or level winder which assists in laying the hose on the drum in adjacent turns. A deployment tunnel or stowage tube may be attached to the drum housing adjacent the serving carriage for containing the stowed drogue. Thus the hose may be deployed from the drum through the deployment tunnel. When the drum housing is in the deployed position, the deployment tunnel may project through the aperture and outside of the aircraft. This provides further protection for the hose.

Preferably the apparatus comprises actuating means for causing movement of the drum between the stowed and deployed positions. For example, the drum housing and the frame may be attached to one another for relative movement by actuators such as screw jacks. Conveniently, there may be a pair of actuators provided on opposing sides of the frame, adjacent the side to which the drum is pivotally mounted.

BRIEF DESCRIPTION OF THE INVENTION

In order that the invention may be more readily understood, reference will now be made to the accompanying drawings in which:

FIG. 1 is a perspective view of an apparatus according to one embodiment of the invention with the drum in the stowed position;

FIG. 2 is a perspective view of the apparatus of FIG. 1 with the drum in the deployed position;

FIG. 4 is a side view showing the apparatus in an installation position.

DETAILED DESCRIPTION OF THE INVENTION

Figure 3B:
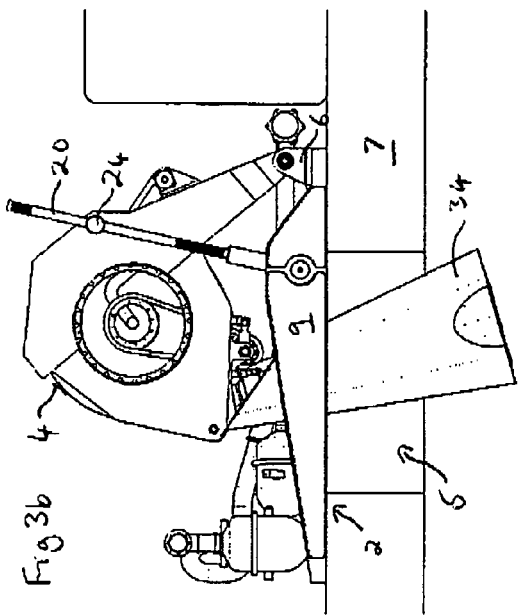
FIGS. 3a to 3d are a series of side views of the apparatus showing movement from the stowed to the deployed positions.
Figure 3D:
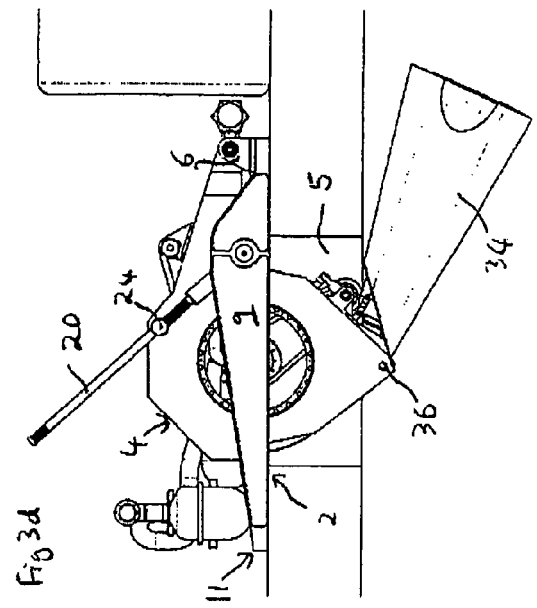

Referring to FIGS. 1, 2 and 3, the apparatus comprises a frame 2 attached to the inside 3 of an aircraft airframe structure 7. The frame 2 is arranged to surround an aperture 5 in the airframe floor. A hose drum 4 is mounted to the frame 2 by a pair of pivot mounts 6, 8 at one side of the frame 2. Thus the drum 4 may pivot about an axis 10 at one edge of the frame 2.

The drum 4 comprises an inner core 12 on which a hose 14 is wound. The drum housing comprises drum housing side members 16 attached to the core 12 at each end thereof. The housing side members 16 include mounting arms 18 pivotally attached to the pivot mounts 6, 8.

The deployment system for the drum 4 comprises a pair of screw jacks 20. The screw jacks are pivotally mounted at one end 22 thereof to side struts 9 of the frame 2, and each pass through a nut 24 mounted to the outside of the drum housing side members 16.

A conventional hose drive system 28 is also attached to the drum 4. The fuel delivery system, indicated generally at 30, includes a pipe 32 with a rotating joint 34 for supplying fuel to the hose 14. A control system (not shown) may also mounted to the frame 2.

The sides 16 of the hose drum housing also mount a serving carriage or level winder 38 through which the deployment end of the hose 14 projects. A drogue 40 is attached to the deployment end of the hose 14 by a coupling 42. The drogue 40 is contained within a stowage tube or deployment tunnel 34. The deployment tunnel is attached to a nose part 36 of each drum housing side member 16 adjacent the carriage 38.

There may be a cut out 52 in the front side of the deployment tunnel 34. This is to enable the drogue to be changed in situ, and also assists in the deployment of the drogue into the airstream by allowing the airflow to enter the tunnel 34. The tunnel 34 includes signal lights 44 at each side, and floodlights 45 for illuminating the deployment tunnel.

The deployment sequence will now be described. Referring to FIG. 1, in the stowed position, it can be seen that the drogue 40 and the deployment tunnel 34 are projecting into the aperture 5, within the structural depth of the aircraft floor 3. The screw jack nuts 24 are near the upper end of travel on the screw jacks 20.

Figure 3A:
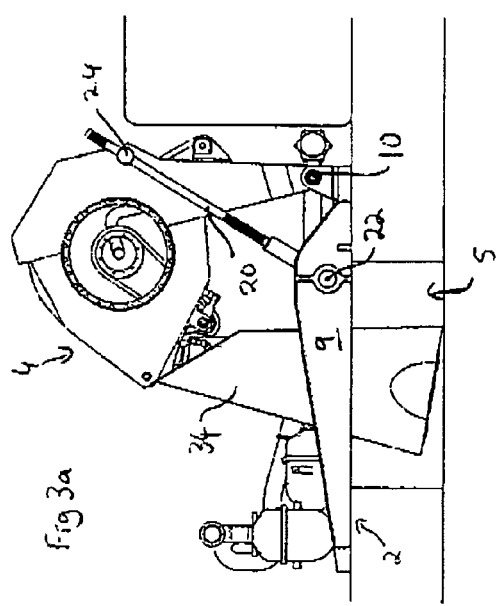
Figure 3C:
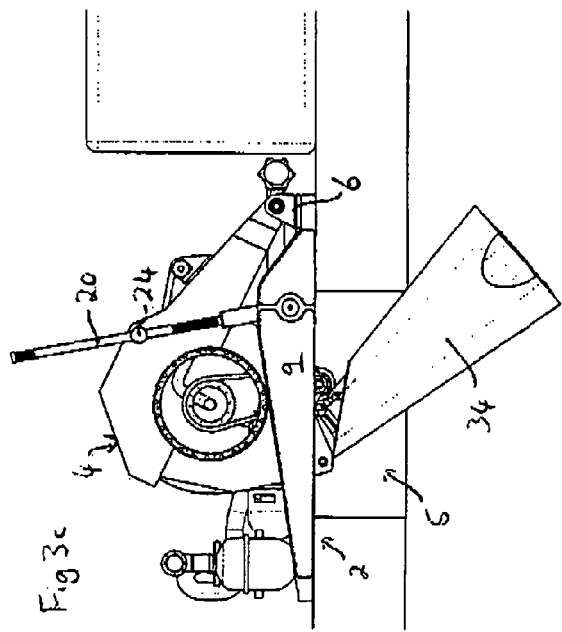

Referring to FIGS. 3a to 3d, the stowed position in FIG. 3a corresponds to that shown in FIG. 1. The screw jacks 20 are slaved together to drive movement of the drum 4. Upon deployment actuation, electrical power is supplied to the screw jacks 20 to turn them and move the nuts 24 downwardly. This causes the drum 4 to rotate around the pivot mount 6, 8 in an anti-clockwise direction as shown in the figures. The screw jacks 20 also begin to pivot round from right to left as shown. Thus the tunnel 34 containing the drogue 40 begins to project from the outside of the airframe structure 7 of the aircraft floor as shown in FIG. 3b.

Upon further actuation, as shown in FIG. 4c, the deployment tunnel 34 begins to point backwardly into the airstream. When fully deployed as shown in FIG. 4d, the nose 36 of each side member 16 projects below the outer surface of the airframe 7, and the tunnel 34 points backwardly into the airstream at a shallow angle to the airframe structure. The tunnel 34 is therefore deployed at an angle which corresponds to that of the natural position of the hose 14 when deployed. In this position, it can be seen that the hose drum 4 projects into aperture in the structural depth of the airframe.

Power may be supplied to the screw jacks by an electric motor. For example, a 28V motor would be capable of deploying the apparatus in about 30 seconds. The screw jack system does not back-drive; ie the nuts may only travel along the jacks 20 when power is applied thereto. Thus the drum and frame are secured in position. The motor may use the aircraft DC power system, or rectified DC from the refuelling unit.

When fully deployed, the drum 4 may be further attached to the frame 2 at the far end 11 opposite the pivot mounts 6, 8 at a single point (not shown). This three point attachment separates the airframe 7 flexing from the drum 4 flexing.

In the application shown, the travel of the drum 4 is restricted by the position of a rear fuel tank 50. However in some embodiments, for example with the fuel tank 50 removed or moved back as shown in FIG. 4, there may be more space around the aperture 5, in which case it is possible for the drum 4 to rotate further around the pivot mounts 6, 8, and move further backwardly. In this position, the drogue 40 and deployment tunnel 34 are completely withdrawn from the aperture 5 in the aircraft floor 5, and are above the base of the frame 2. This position may be adopted for installation or removal of the apparatus.

The invention claimed is:

1. Apparatus for deploying a refueling hose and a drogue from an aperture in an aircraft airframe, the apparatus comprising a frame, means for attaching the frame to the inside of an aircraft airframe adjacent an aperture therein, a hose drum for mounting a refueling hose and a drogue, the hose drum being rotatably mounted on the frame about an axis of rotation and means for moving said axis of rotation of the hose drum relative to the frame between a stowed position where the hose drum is located above the aperture and within the aircraft frame and a deployed position spaced from the stowed position where at least a part of the hose drum is located in the aperture of the aircraft airframe.

2. The apparatus as claimed in claim 1, in which the frame is attached adjacent to at least one edge of the aperture.

3. The apparatus as claimed in claim 2, in which the axis of rotation of the hose drum is pivotally mounted to the frame.

4. The apparatus as claimed in claim 3, in which the axis of rotation of the hose drum is mounted in a drum housing which drum housing is pivotally mounted to the frame.

5. The apparatus as claimed in claim 4, including a hose serving carriage and a deployment tunnel for containing the drogue attached to the drum housing.

6. The apparatus as claimed in claim 5, in which the hose serving carriage and the deployment tunnel are arranged to project below the frame when the axis of rotation of the hose drum is moved to the deployed position.

7. The apparatus as claimed in claim 1, in which the means for moving the axis of rotation of the hose drum relative to the frame includes actuating means arranged to cause movement of the axis of rotation of the hose drum between the stowed and deployed positions.

8. The apparatus as claimed in claim 7, in which the axis of rotation of the hose drum is mounted in a drum housing which drum housing is pivotally mounted to the frame and the actuating means for moving the axis of rotation of the hose drum between the stowed and deployed positions includes an actuator member extending between the drum housing and the frame.

9. The apparatus as claimed in claim 8, in which a pair of actuator members is provided on opposing sides of the frame, adjacent a side to which the drum housing is pivotally mounted to the frame.

* * * * *